US010087698B2

(12) United States Patent
Dev et al.

(10) Patent No.: US 10,087,698 B2
(45) Date of Patent: Oct. 2, 2018

(54) VARIABLE RAM PACKER FOR BLOWOUT PREVENTER

(71) Applicant: General Electric Company, Schenectady, NY (US)

(72) Inventors: Bodhayan Dev, Niskayuna, NY (US); Aaron John Mashue, Houston, TX (US); Deepak Trivedi, Halfmoon, NY (US); Jifeng Wang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 35 days.

(21) Appl. No.: 14/957,963

(22) Filed: Dec. 3, 2015

(65) Prior Publication Data
US 2017/0159391 A1   Jun. 8, 2017

(51) Int. Cl.
*E21B 33/06* (2006.01)
*B29C 45/16* (2006.01)
*B29K 19/00* (2006.01)
*B29L 31/26* (2006.01)

(52) U.S. Cl.
CPC ........ *E21B 33/061* (2013.01); *B29C 45/1676* (2013.01); *E21B 33/062* (2013.01); *B29K 2019/00* (2013.01); *B29K 2995/0046* (2013.01); *B29L 2031/26* (2013.01)

(58) Field of Classification Search
CPC . E21B 33/061; E21B 33/062; B29C 45/1676; B29K 2995/0046; B29K 2019/00; B29L 2031/26
USPC ..................... 251/1.1–1.3, 368; 277/325–326
See application file for complete search history.

(56) References Cited

U.S. PATENT DOCUMENTS

| 3,669,408 | A | * | 6/1972 | Baxter, Jr. | ................. F16K 1/42 251/359 |
| 4,541,639 | A | * | 9/1985 | Williams, III | ........ E21B 33/062 251/1.3 |
| 4,825,948 | A | * | 5/1989 | Carnahan | .............. E21B 33/062 166/277 |
| 4,930,745 | A | * | 6/1990 | Granger | ................ E21B 33/062 251/1.1 |

(Continued)

FOREIGN PATENT DOCUMENTS

| WO | 2006102171 A2 | 9/2006 |
| WO | 2011147021 A1 | 12/2011 |
| WO | 2014105629 A2 | 7/2014 |

OTHER PUBLICATIONS

GE Oil & Gas Drilling & Production, Hydril Pressure Control Annu-Flex, dated 2010, pp. 26.

(Continued)

*Primary Examiner* — John Bastianelli
(74) *Attorney, Agent, or Firm* — GE Global Patent Operation; Pabitra Chakrabarti

(57) ABSTRACT

A variable ram packer includes a body including two contact regions. The first contact region includes a region of the body of the packer that includes a first material and a second material, layered on top of one another. The first material has an elastic modulus less than that of the second material. The second contact region includes the second material and a third material, layered on top of one another. The third material has an elastic modulus greater than that of the second material, but less than that of the first material.

16 Claims, 3 Drawing Sheets

(56) References Cited

U.S. PATENT DOCUMENTS

| | | | |
|---|---|---|---|
| 5,005,802 A | 4/1991 | McWhorter et al. | |
| 5,013,005 A * | 5/1991 | Nance | E21B 33/062 |
| | | | 251/1.3 |
| 5,294,088 A * | 3/1994 | McWhorter | E21B 33/062 |
| | | | 251/1.3 |
| 6,296,225 B1 | 10/2001 | Walls | |
| 6,896,063 B2 | 5/2005 | Chang et al. | |
| 6,955,357 B2 | 10/2005 | Griffin et al. | |
| 7,188,678 B2 | 3/2007 | Richard et al. | |
| 7,743,825 B2 | 6/2010 | O'Malley et al. | |
| 7,857,066 B2 | 12/2010 | DiFoggio et al. | |
| 8,091,855 B1 * | 1/2012 | Huang | C08K 3/04 |
| | | | 166/85.4 |
| 8,176,933 B2 * | 5/2012 | Huff | B29C 35/0222 |
| | | | 251/1.2 |
| 8,240,392 B2 | 8/2012 | Barnard et al. | |
| 8,397,836 B2 | 3/2013 | Pool et al. | |
| 8,439,082 B2 | 5/2013 | O'Connell | |
| 8,443,892 B2 | 5/2013 | Richard et al. | |
| 8,464,787 B2 | 6/2013 | O'Malley | |
| 8,616,276 B2 | 12/2013 | Tips et al. | |
| 8,646,537 B2 | 2/2014 | Tips et al. | |
| 8,684,100 B2 | 4/2014 | Tingler et al. | |
| 2004/0021269 A1 | 2/2004 | Gaudette et al. | |
| 2004/0112597 A1 | 6/2004 | Hamid et al. | |
| 2006/0272826 A1 | 12/2006 | Shuster et al. | |
| 2008/0264647 A1 | 10/2008 | Li | |
| 2010/0140516 A1 * | 6/2010 | Butuc | B29C 71/04 |
| | | | 251/368 |
| 2010/0163252 A1 | 7/2010 | Regnault De La Mothe et al. | |
| 2010/0294482 A1 | 11/2010 | Araujo et al. | |
| 2010/0310385 A1 | 12/2010 | Denne | |
| 2010/0319906 A1 | 12/2010 | Van Winkle | |
| 2011/0259587 A1 | 10/2011 | Joseph et al. | |
| 2012/0000648 A1 | 1/2012 | Mathew et al. | |
| 2012/0018153 A1 | 1/2012 | Yeh et al. | |
| 2012/0055667 A1 | 3/2012 | Ingram et al. | |
| 2012/0139250 A1 | 6/2012 | Inman et al. | |
| 2012/0175845 A1 | 7/2012 | Duan et al. | |
| 2012/0205105 A1 | 8/2012 | Le Roy-Delage et al. | |
| 2012/0205106 A1 | 8/2012 | Le Roy-Delage et al. | |
| 2012/0305253 A1 | 12/2012 | O'Malley | |
| 2013/0037267 A1 | 2/2013 | Regnault De La Mothe et al. | |
| 2013/0062049 A1 | 3/2013 | Ren et al. | |
| 2013/0062061 A1 | 3/2013 | Taylor et al. | |
| 2013/0087333 A1 | 4/2013 | Seth et al. | |
| 2013/0126170 A1 | 5/2013 | Johnson et al. | |
| 2013/0140043 A1 | 6/2013 | Swanson et al. | |
| 2013/0146286 A1 | 6/2013 | Le Roy-Delage et al. | |
| 2013/0256991 A1 | 10/2013 | Ramon et al. | |
| 2013/0341538 A1 * | 12/2013 | Huang | E21B 33/06 |
| | | | 251/1.1 |
| 2014/0020910 A1 | 1/2014 | Falkner et al. | |
| 2014/0027129 A1 | 1/2014 | Hannegan et al. | |
| 2014/0054043 A1 | 2/2014 | O'Malley | |
| 2014/0183381 A1 | 7/2014 | Carbaugh et al. | |
| 2014/0183382 A1 | 7/2014 | Carbaugh et al. | |
| 2015/0040990 A1 | 2/2015 | Mathiesen et al. | |
| 2015/0115535 A1 | 4/2015 | Trivedi et al. | |
| 2015/0167417 A1 | 6/2015 | Larson et al. | |
| 2015/0198003 A1 | 7/2015 | Schaeper | |
| 2017/0159391 A1 | 6/2017 | Dev et al. | |
| 2017/0159392 A1 | 6/2017 | Trivedi et al. | |
| 2017/0167219 A1 | 6/2017 | Wang et al. | |
| 2017/0204695 A1 | 7/2017 | Bodhayan et al. | |

OTHER PUBLICATIONS

PCT Search Report and Written Opinion issued in connection with corresponding PCT Application No. PCT/US2016/064074 dated May 22, 2017.

* cited by examiner

VARIABLE RAM PACKER FOR BLOWOUT PREVENTER

BACKGROUND

The field of the disclosure relates generally to a blowout preventer (BOP) for oil and gas wells, and more particularly, to a variable ram for a BOP.

Most known BOPs mount on top of a wellhead and provide a means to regulate the pressure of a wellbore. Variable bore rams typically include a pair of rams on opposing sides of a BOP stack that actuate to form a sealed arrangement with a drill pipe. When the variable bore rams are actuated radially inward, the inner most bore face contacts the outer surface of a drill pipe and forms a sealing arrangement. Some known variable rams include metallic inserts and elastomer packers that cooperate as a coherent unit to create a seal across drill pipes of different sizes.

Some known designs for variable bore rams incorporate a stiffer material along a bore contact surface. Generally, at high temperatures and high pressures, these rams undergo large deformation across the bore contact surface, face recess, and other critical regions of the packer, resulting in a breakdown of the stiffer material and a reduction of service life of the ram. In order to improve the service life of the ram, reinforcing filler materials such as elastomers would need to have both a large modulus of elasticity and a large elongation capacity. However, these two requirements typically conflict with each other because the addition of reinforcing filler materials typically improves one property at the cost of the other.

Many known designs that add a stiffer material on the bore contact surface do not help facilitate decreasing deterioration of the bore contact surface as the material undergoes significant deformation. Because the stiffer materials tend to have a lower elongation capacity, they typically do not facilitate large deformation.

BRIEF DESCRIPTION

In one aspect, a variable bore ram packer for a blowout preventer (BOP) is provided. The variable bore ram packer includes a body with two contact regions. The first contact region includes a region of the body of the packer that connects the variable bore ram to a drill pipe. The first contact region includes two materials, a first material and a second material, layered on top of one another. The first material has an elastic modulus greater than that of the second material. The second contact region includes a region of the body of the packer that connects the packer to an opposed variable bore ram packer. The second contact region includes the second material and a third material. The third material has an elastic modulus greater than that of the second material, but less than that of the first material.

In another aspect, a variable bore ram for a BOP is provided. The variable bore ram includes a ram block that houses a variable bore ram packer. The variable bore ram packer includes two contact regions. The first contact region includes a region of the body of the packer that connects the variable bore ram to a drill pipe. The first contact region includes two materials, a first material and a second material, layered on top of one another. The first material has an elastic modulus greater than that of the second material. The second contact region includes a region of the body of the packer that connects the packer to an opposed variable bore ram packer. The second contact region includes the second material and a third material. The third material has an elastic modulus greater than that of the second material, but less than that of the first material.

In yet another aspect, a method of manufacturing a variable ram packer for a BOP is provided. The variable ram packer includes a body with a contact region including a first contact region that is at least partially curved and a second contact region next to the first contact region. The method includes molding the first contact region with a layer of first material and a layer of second material stacked on top of one another. The first material has an elastic modulus greater than the elastic modulus of the second material. The method also includes molding the second contact region with a layer of second material and a layer of third material stacked on top of one another. The third material has an elastic modulus greater than the elastic modulus of the second material, but less than the elastic modulus of the first material.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

"Variable bore ram" and "variable ram" are used interchangeably, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The variable bore ram described herein overcomes several deficiencies associated with known blowout preventers (BOP). Specifically, regions of the variable bore ram that require a stiff material are separated from the regions of the variable bore ram that require a soft material. Additionally, a third material with intermediate stiffness is used in regions that require a material that is sufficiently stiff, but soft enough to sufficiently elongate. Separating the critical regions of the variable bore ram described herein into at least three regions, each with a different elongation capacity, improves contact pressure between the variable bore ram and the drill pipe for improved sealing effectiveness. In addition to improving contact pressure, the variable bore ram elongates less at high temperatures and pressures than other known rams, thereby improving reliability and expected service life.

Figure 1:
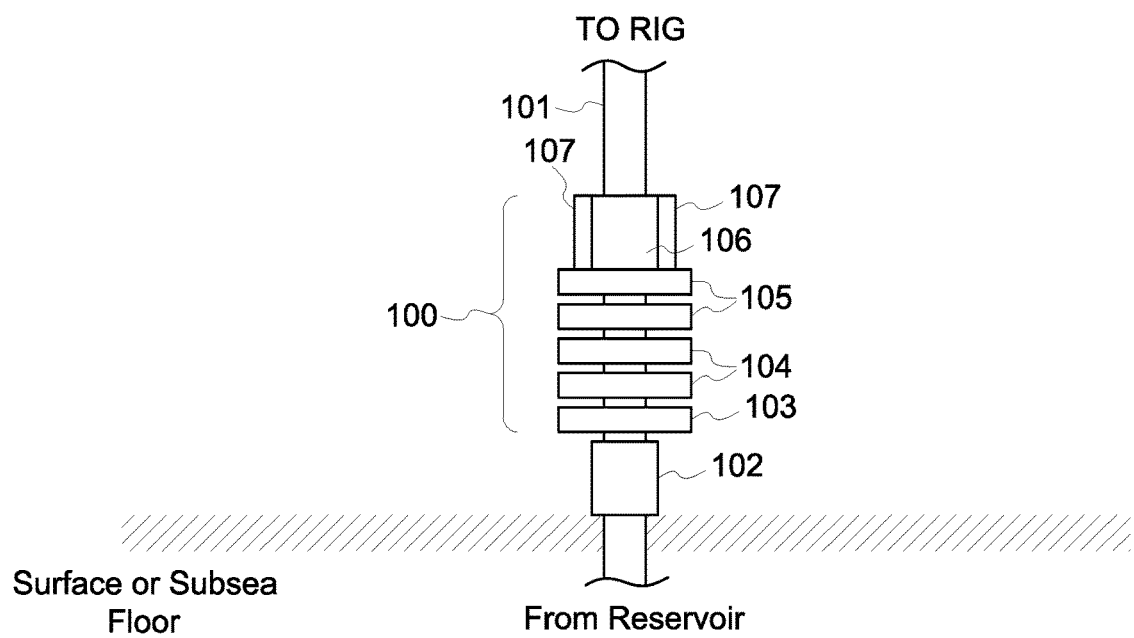
FIG. 1 is a schematic view of an exemplary blowout preventer (BOP) stack.

FIG. 1 is a schematic view of an exemplary blowout preventer (BOP) stack 100. BOP stack 100 surrounds a drill pipe 101 and mounts on top of a wellhead connector 102 that includes both a wellhead and a tree (not specifically shown). Known BOP stacks, such as BOP stack 100, typically include a test ram 103, a plurality of variable bore rams 104, a plurality of shear rams 105, a plurality of annular rams 106, and a plurality of control pods 107.

Figure 2:
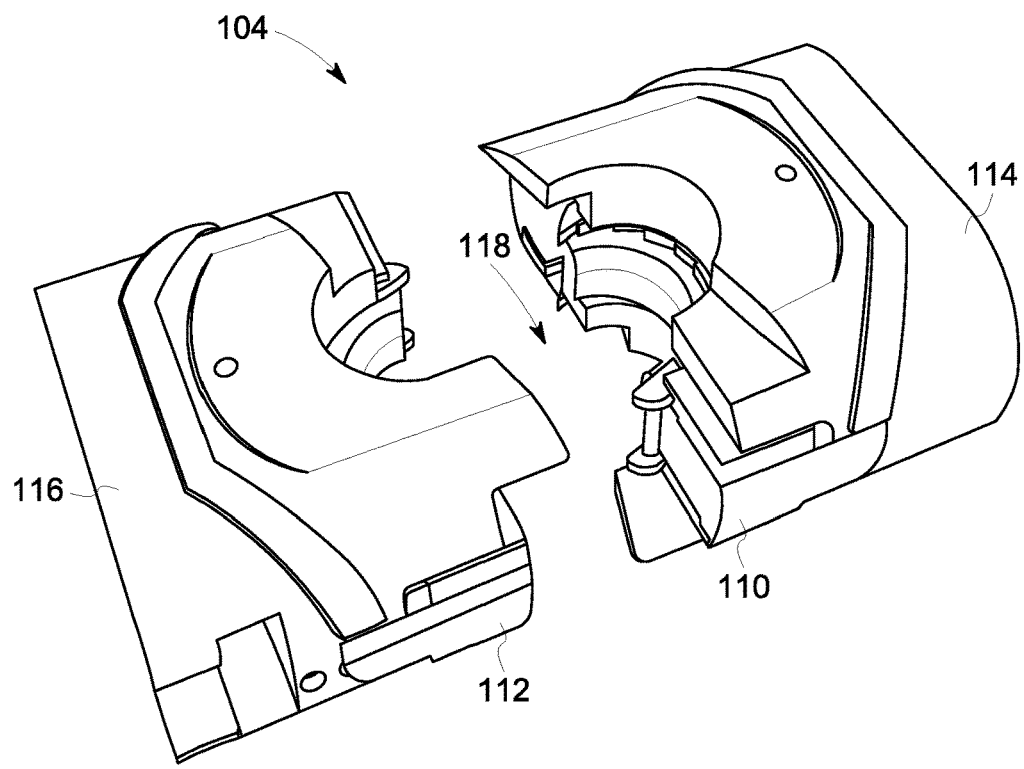
FIG. 2 is an isometric view of an exemplary variable bore ram that is used with the BOP stack shown in FIG. 1.

FIG. 2 is an isometric view of an exemplary variable bore ram 104 that is used with BOP 100 (shown in FIG. 1). Variable bore ram 104 includes two opposed variable ram packers 110, 112, each housed with a respective ram block 114, 116. Variable ram packers 110, 112 are replaced when sufficiently worn and are therefore removed and replaced by inserting a new set of variable ram packers 110, 112 into ram block 114, 116. When variable bore ram 104 is in use, ram blocks 114, 116 are actuated toward each other, typically through piston or hydraulic means, such that ram blocks 114, 116 couple together and packers 110, 112 couple together to define a substantially circular bore 118. Bore 118 is configured to receive drill pipe 101, around which variable ram packers 110, 112 form a sealing arrangement as described herein.

Figure 3:
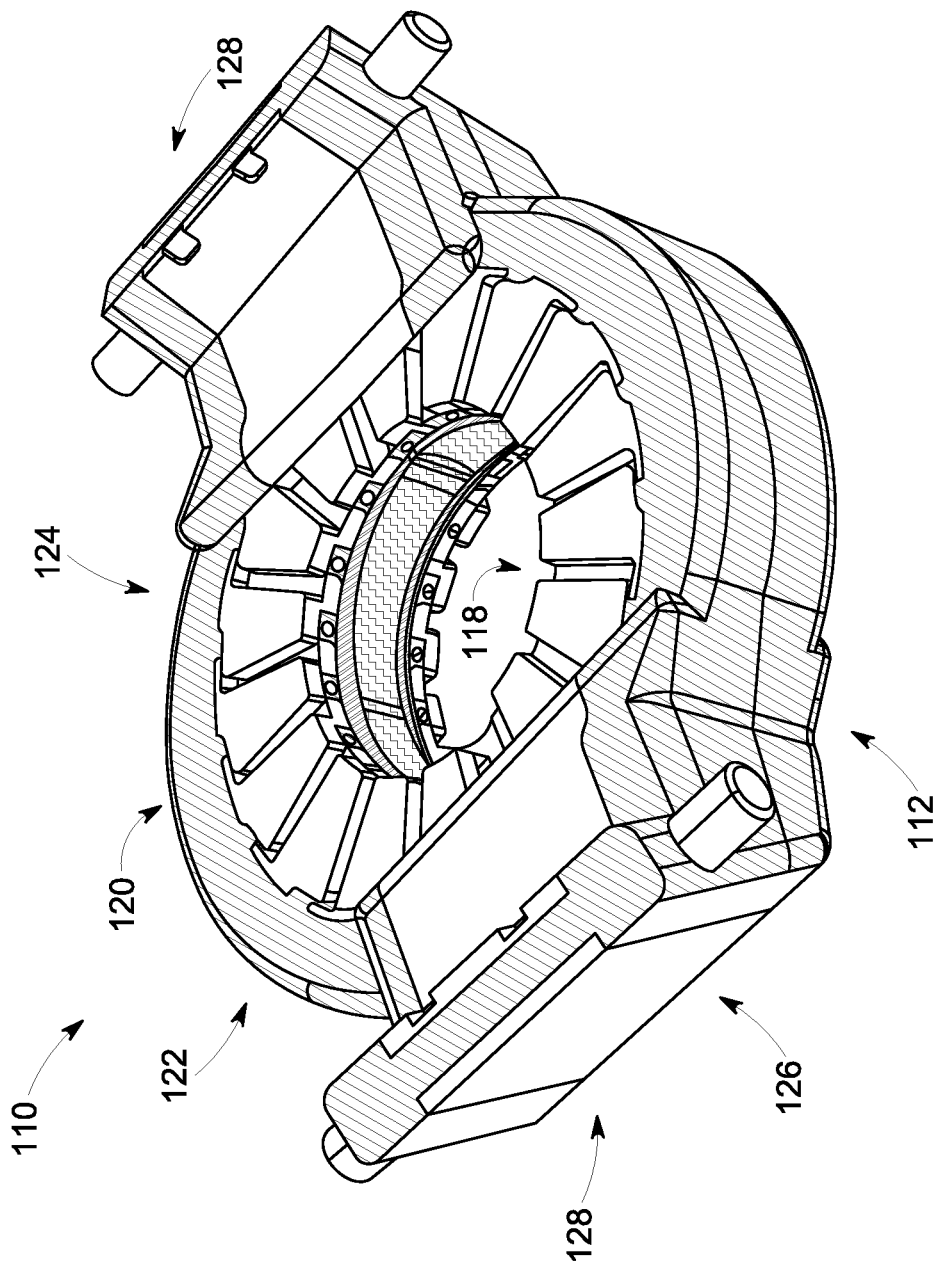
FIG. 3 is an isometric view of an exemplary variable bore ram packer coupled with an opposed variable bore ram packer that are used with the variable bore ram shown in FIG. 2.

FIG. 3 is an isometric view of an exemplary variable bore ram packer 110 coupled with an opposed variable bore ram packer 112 that are used with variable bore ram 104 (shown in FIG. 2). Packer 110 is substantially symmetrical to packer 112, such that packer 110 receives packer 112 when in a sealed arrangement. The parts of packer 110 disclosed herein describe the same or similar parts on packer 112. Packer 110 includes a body 120 with a curved back region 122, an upper region 124, a lower region 126, and two side flaps 128 that angle upward and away from bore 118.

Figure 4:
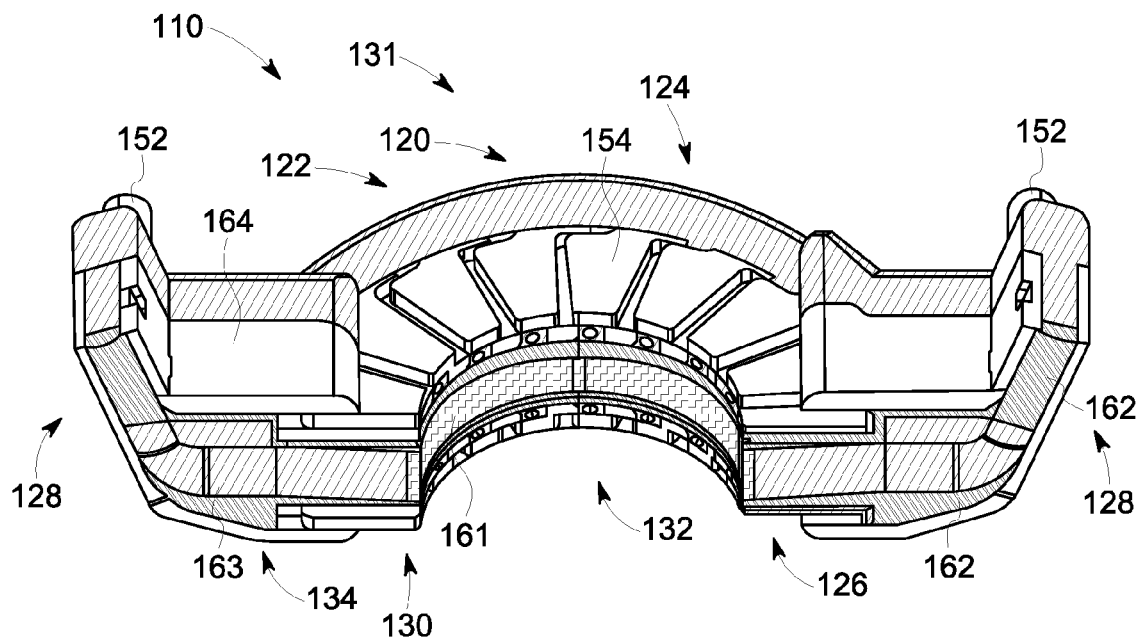
FIG. 4 is a side perspective view of the variable bore ram packer shown in FIG. 3 showing the regions of materials used in the packer.

FIG. 4 is a side perspective view of variable bore ram packer 110 showing the regions of materials used in packer 110. Along the front of packer 110, opposite of back region 122, body 120 of packer 110 includes a contact region 130. The remaining portion of body 120 of packer 110 that is not contact region 130 is peripheral region 131 of packer 110. Contact region 130 includes both a bore contact region 132, also described as a first contact region, and a packer contact region 134, also described as a second contact region. Bore contact region 132 is adjacent to packer contact region 134 laterally on both sides of bore contact region 132. Bore contact region 132 is at least partially arcuate, i.e. semi-circular or arcual, to receive drill pipe 101 when in a sealed position. Bore contact region 132, as described herein, is also known as a tubular contact region or a bore-face region, and includes the extent of contact region 130 that seals with drill pipe 101. Although only the surface of bore contact region 132 directly contacts drill pipe 101 when in a sealing arrangement, bore contact region 132 is defined as both the surface and the volume of material behind the surface, extending radially into body 120 of packer 110. Packer contact region 134 includes the portion of contact region 130 that does not contact drill pipe 101 when in a sealing arrangement, but instead contacts opposed packer 112. Packer contact region 134 is shaped to receive opposed packer 112. Although only the surface of packer contact region 134 directly contacts opposed packer 112, packer contact region 134 is defined as both the surface and the volume of material behind the surface, extending laterally into body 120 of packer 110. When packer 110 is urged radially inward towards bore 118, bore contact region 132 is compressed against the outer surface of drill pipe 101, creating a sealing arrangement between packer 110 and drill pipe 101. Packer 110 includes packer pins 152 coupled to body 120 that enable packer 110 to couple to ram block 114. Packer 110 includes a plurality of packer inserts 154. Packer inserts 154 are triangular-shaped members arranged around bore 118 on both upper region 124 and lower region 126 of packer 110. In one embodiment, inserts 154 are configured to rotate radially inward towards bore 118 when rams 110, 112 are in a sealed arrangement to provide support for bore contact region 132. Inserts 154 facilitate distributing pressure uniformly around drill pipe 101.

The exemplary embodiment includes three different materials along contact region 130 to facilitate enhancing the service life of packer 110. Contact region 130 incorporates first material 161, second material 162, and third material 163. First material 161 is stiffer than second material 162 and third material 163. Third material 163 is stiffer than second material 162. The terms "stiff" or "stiffer", as used herein, refer to one material having a higher modulus of elasticity than another material. Therefore, first material 161 has a higher modulus of elasticity than both second material 162 and third material 163, and third material 163 has a higher modulus of elasticity than second material 162. As used herein, the terms "modulus of elasticity" and "elastic modulus" are equivalent, and refer to the Young's modulus values of the respective materials.

First material 161 is stiffer than second material 162 and third material 163 to facilitate withstanding higher pressure. However, relying solely on first material 161 along bore contact region 132 decreases the ability of packer 110 to elongate under high pressure and high temperature conditions, potentially leading to a reduced service life of packer 110. Therefore, first material 161 is axially juxtaposed with a layer of second material 162 above, toward top region 124, and below, toward bottom region 126, the layer of first material 161. First material 161 and second material 162 extend a distance radially into body 120 of packer 110. Incorporating both first material 161 and second material 162 along bore contact region 132 facilitates more evenly disbursing pressure between bore contact region 132 and drill pipe 101, while enhancing the ability for bore contact region 132 to elongate in high pressure, high temperature conditions. For example, at about 176 degrees Celsius (° C.) (about 350 degrees Fahrenheit (° F.)) and about 120 megapascals (MPa) (about 17,400 pounds per square inch (psi)), bore contact region 132 experiences a principle strain of less than about 1.4, which is about 58% of the true strain of bore contact region 132. The service life of the packer is potentially improved because this true strain is less than about 66% of the true strain, which corresponds to a ratio of material strength to design load of 1.5, a commonly accepted ratio for oil and gas equipment in the industry.

Packer contact region 134 includes second material 162 and third material 163. Third material 163 has an elastic modulus less than first material 161 but greater than second material 162. In the exemplary embodiment, a layer of third material 163 is axially juxtaposed with a layer of second material 162 above and below the layer of third material 163. In another embodiment, only one layer of second material 162 is axially juxtaposed with third material 163, either above or below third material 163. Second material 162 extends a distance laterally into body 120 away from opposed packer 112. By incorporating both second material 162 and third material 163 along packer contact region 134, packer contact region 134 has the capacity to elongate better than known designs under high pressure, high temperature conditions. For example, at about 176 degrees Celsius (° C.) (about 350 degrees Fahrenheit (° F.)) and about 120 megapascals (MPa) (about 17,400 pounds per square inch (psi)), packer contact region 134 experiences a principle strain of less than about 1.0, which is about 42% of the true strain of bore contact region 132. The service life of the packer is potentially improved because this true strain is less than about 66% of the true strain, which corresponds to a ratio of material strength to design load of 1.5, a commonly accepted ratio for oil and gas equipment in the industry.

In one embodiment, each of first material 161, second material 162, and third material 163 are elastomers, each with a modulus of elasticity relative to the other materials as described herein. Specifically, first material 161 is a hydrogenated nitrile butadiene rubber (HNBR), second material 162 is a carboxylated nitrile rubber (XNBR), and third material 163 is a fluoroelastomer (FKM). In other embodiments, first material 161, second material 162, and third material 163 are any suitable materials that enable enhancing the overall capacity of packer 110 to elongate and improve contact pressure with drill pipe 101 as described herein. During manufacturing, body 120 of packer 110 is formed as a unitary body, preferably through injection molding. In one embodiment, manufacturing includes shaping with a mold at least one layer of first material 161 and at least one additional layer of second material 162 within bore contact region 132, and shaping with a mold at least one layer of second material 162 and at least one additional layer of third material 163 within packer contact region 134. Alternatively, body 120 of packer 110 is formed as individual parts and assembled. Alternatively, portions of body 120 are fabricated separately and later manufactured as packer 110.

Figure 5:
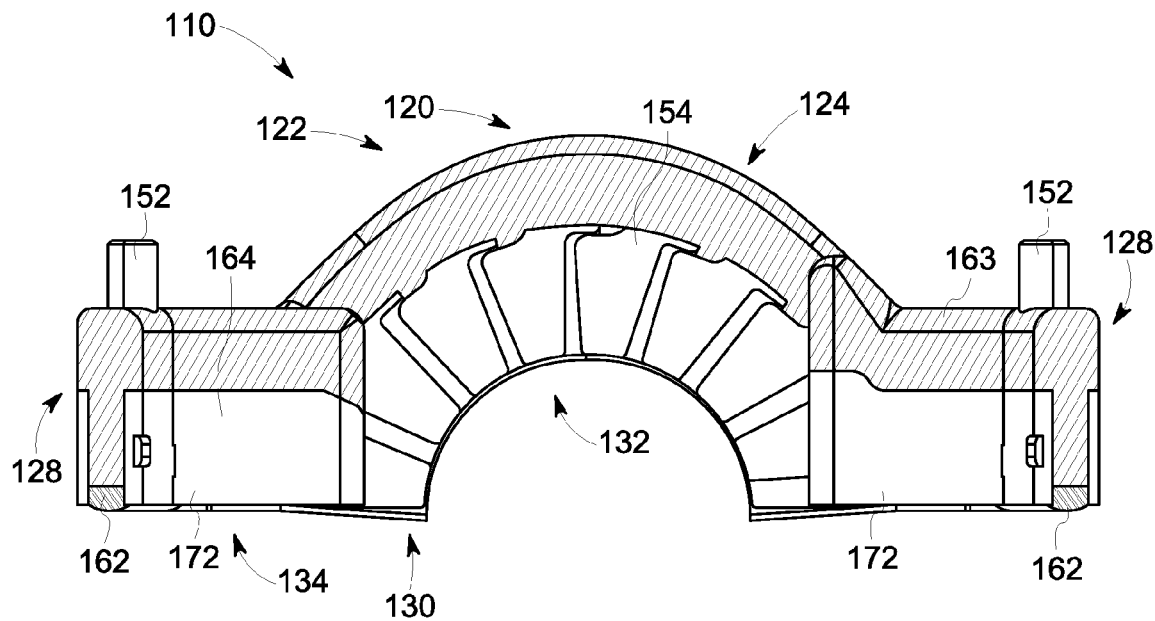
FIG. 5 is a top plan view of the variable bore ram packer shown in FIG. 4.

FIG. 5 is a top plan view of exemplary variable bore ram packer 110 in FIG. 4. In the exemplary embodiment, peripheral region 131 of body 120 includes at least one layer of third material 163. In another embodiment, back region 122 of body 120 includes any suitable material that facilitates reinforcement of contact region 130. In the illustrated embodiment, packer pins 152 and packer inserts 154 include a fourth material, i.e. a support material 164. In one embodiment, support material 164 is a nickel-chromium alloy, such as Inconel®. In another embodiment, support material 164 is any suitable material that assists in supporting bore contact region 132, as described herein. Packer 110 also includes insert containment parts 172 along upper region 124 and lower region 126, positioned above and below inserts 154 and extending between packer contact region 134 and peripheral region 131. In the exemplary embodiment, insert containment parts 172 include support material 164, including a nickel-chromium alloy.

The above-described variable bore ram described herein overcomes several deficiencies associated with known blowout preventers (BOP). Specifically, regions of the variable bore ram that require a stiff material are separated from the regions of the variable bore ram that require a soft material. Additionally, a third material with intermediate stiffness is used in regions that require a material that is sufficiently stiff, but soft enough to sufficiently elongate. Separating the critical regions of the variable bore ram described herein into at least three regions, each with a different elongation capacity, improves contact pressure between the variable bore ram and the drill pipe for improved sealing effectiveness. In addition to improving contact pressure, the variable bore ram elongates less at high temperatures and pressures than other known rams, thereby improving reliability and expected service life.

An exemplary technical effect of the methods, systems, and apparatus described herein includes at least one of: (a) increasing the service life of variable bore rams by separating regions of the variable bore ram that require a stiff material from the regions of the variable bore ram that require a soft material, and further including a third material with intermediate stiffness in regions that require both stiffness and potential capacity to elongate; (b) improving the contact pressure between the variable bore ram and the drill pipe by separating the critical regions of the variable bore ram, as described herein; and (c) improving the sealing effectiveness of the variable bore ram under high pressure, high temperature conditions because of the improved contact pressure.

Exemplary embodiments of a variable bore ram are described above in detail. The variable bore ram and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with other types of rams for BOPs, such as fixed bore rams or annular rams, and are not limited to practice with only the devices, systems and methods as described herein. Rather, the exemplary embodiment can be implemented and utilized in connection with many other applications, equipment, and systems that may benefit from using a variable bore ram for sealing a pipe or regulating pressure of a pipe.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable ram packer, comprising:
   body;
   a bore contact region for contacting and sealing a drill pipe, said bore contact region comprising at least one first material with a first elastic modulus and at least one second material with a second elastic modulus less than the first elastic modulus, wherein said at least one first material is axially juxtaposed with said at least one second material; and
   at least one packet contact region adjacent to and radially extending from said bore contact region for contacting an opposed variable ram packer opposite said at least one packer contact region when in a sealed arrangement, wherein said packer contact region comprises the at least one second material with the second elastic modulus and at least one third material with a third elastic modulus greater than the second elastic modulus but less than the first elastic modulus, wherein said at least one third material is axially juxtaposed to said at least one second material.

2. The variable ram packer in accordance with claim 1, wherein said bore contact region is at least partially arcual.

3. The variable ram packer in accordance with claim 1 further comprising at least one packer pin coupled to said body.

4. The variable ram packer in accordance with claim 1 further comprising a plurality of packer inserts axially juxtaposed above and below said bore contact region.

5. The variable ram packer in accordance with claim 4, wherein said plurality of packer inserts configured to rotate radially inward.

6. The variable ram packer in accordance with claim 1, wherein said at least one first material comprises a hydrogenated nitrile butadiene rubber (HNBR).

7. The variable ram packer in accordance with claim 1, wherein said at least one second material comprises a carboxylated nitrile rubber (XNBR).

8. The variable ram packer in accordance with claim 1, wherein said at least one third material comprises a fluoroelastomer (FKM).

9. The variable ram packer in accordance with claim 1, wherein said bore contact region further comprises one layer of said at least one first material axially juxtaposed between two layers of said at least one second material.

10. The variable ram packer in accordance with claim 1, wherein said packer contact region further comprises one layer of said at least one third material axially juxtaposed between two layers of said at least one second material.

11. The variable ram packer in accordance with claim 1, wherein said body further comprises a peripheral region, said peripheral region comprising at least one layer of said at least one third material.

12. The variable ram packer in accordance with claim 11, wherein said body further comprises insert containment parts positioned above and below said second contact region, wherein at least a portion of said insert containment parts extend between said second contact region and said peripheral region.

13. The variable ram packer in accordance with claim 12, wherein said insert containment parts comprise a nickel-chromium alloy.

14. A variable bore ram assembly comprising:
   at least one ram block; and
      at least one ram packer disposed in said at least one ram block, said at least one ram packer comprising:
      a body;
      a bore contact region for contacting a pipe, said bore contact region comprising at least one first material with a first elastic modulus and at least one second material with a second elastic modulus less than said first elastic modulus, wherein said at least one first material is axially juxtaposed to said at least one second material; and
      at least one packer contact region adjacent to and radially extending from said bore contact region for contacting an opposed variable ram packer opposite said at least one packer contact region when in a sealed arrangement, said second contact region comprising the at least one second material with the second elastic modulus and at least one third material with a third elastic modulus greater than the second elastic modulus but less than the first elastic modulus, wherein said at least one third material is axially juxtaposed with said at least one second material.

15. The variable bore ram assembly in accordance with claim 14, wherein said bore contact region further comprises one layer of said at least one first material axially juxtaposed between two layers of said at least one second material.

16. The variable bore ram assembly in accordance with claim 14, wherein said packer contact region further comprises one layer of said at least one third material axially juxtaposed between two layers of said at least one second material.

* * * * *